Nov. 12, 1968  J. A. SCHARBROUGH  3,410,543
MEANS FOR DISCHARGING MATERIAL FROM A ROTARY HEARTH FURNACE
Filed Nov. 22, 1965  6 Sheets-Sheet 1
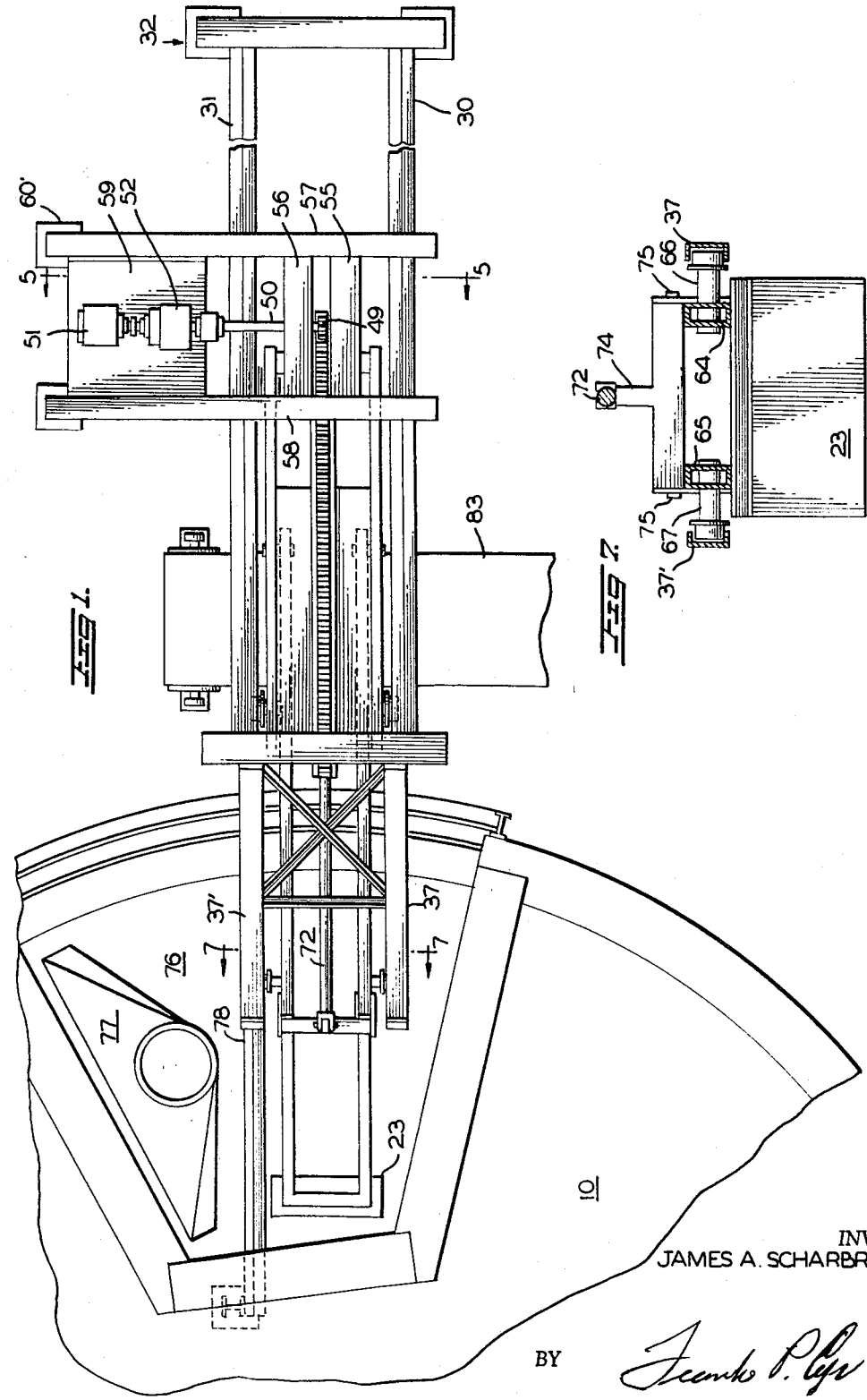
INVENTOR
JAMES A. SCHARBROUGH
BY
ATTORNEY

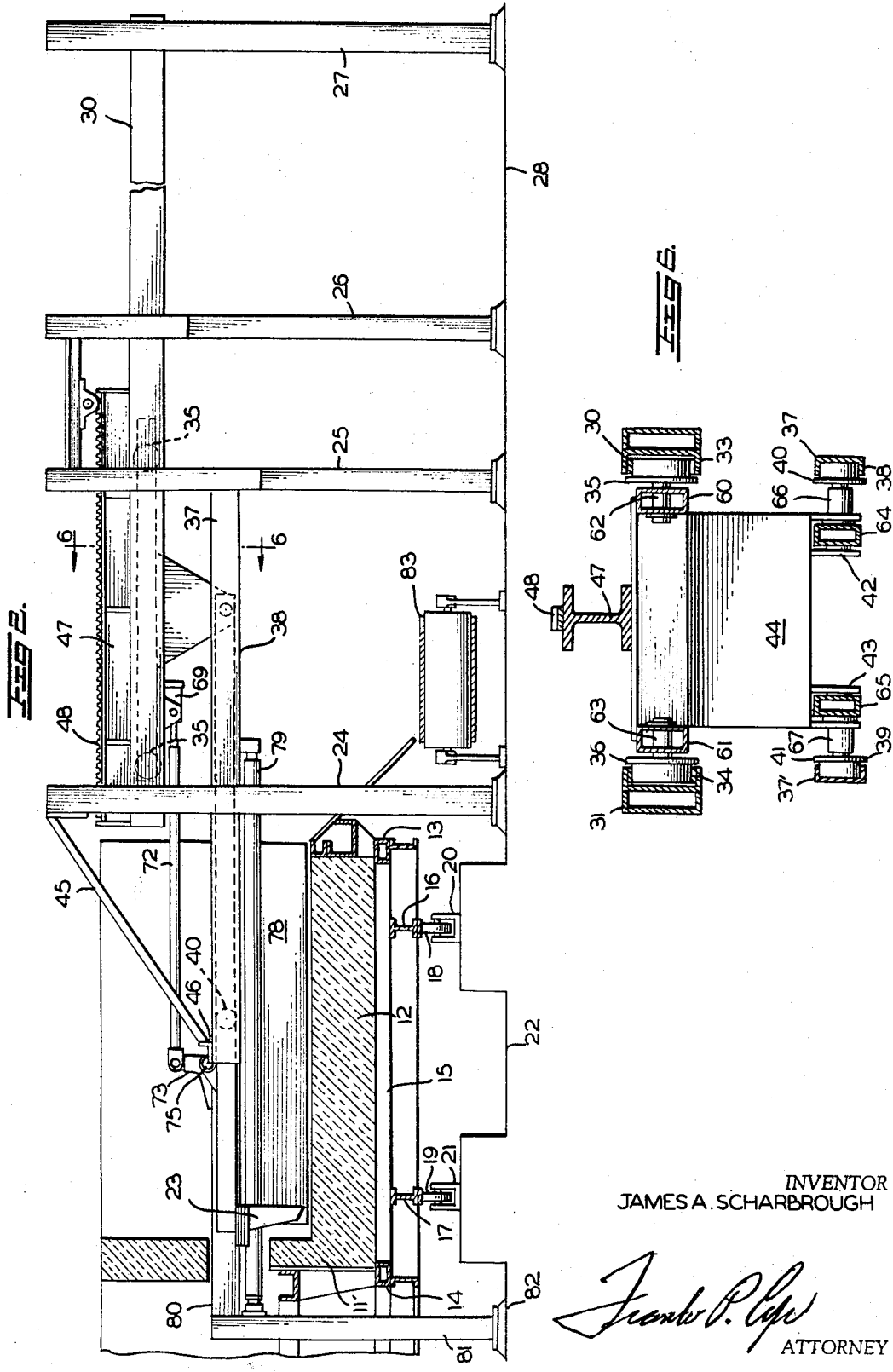

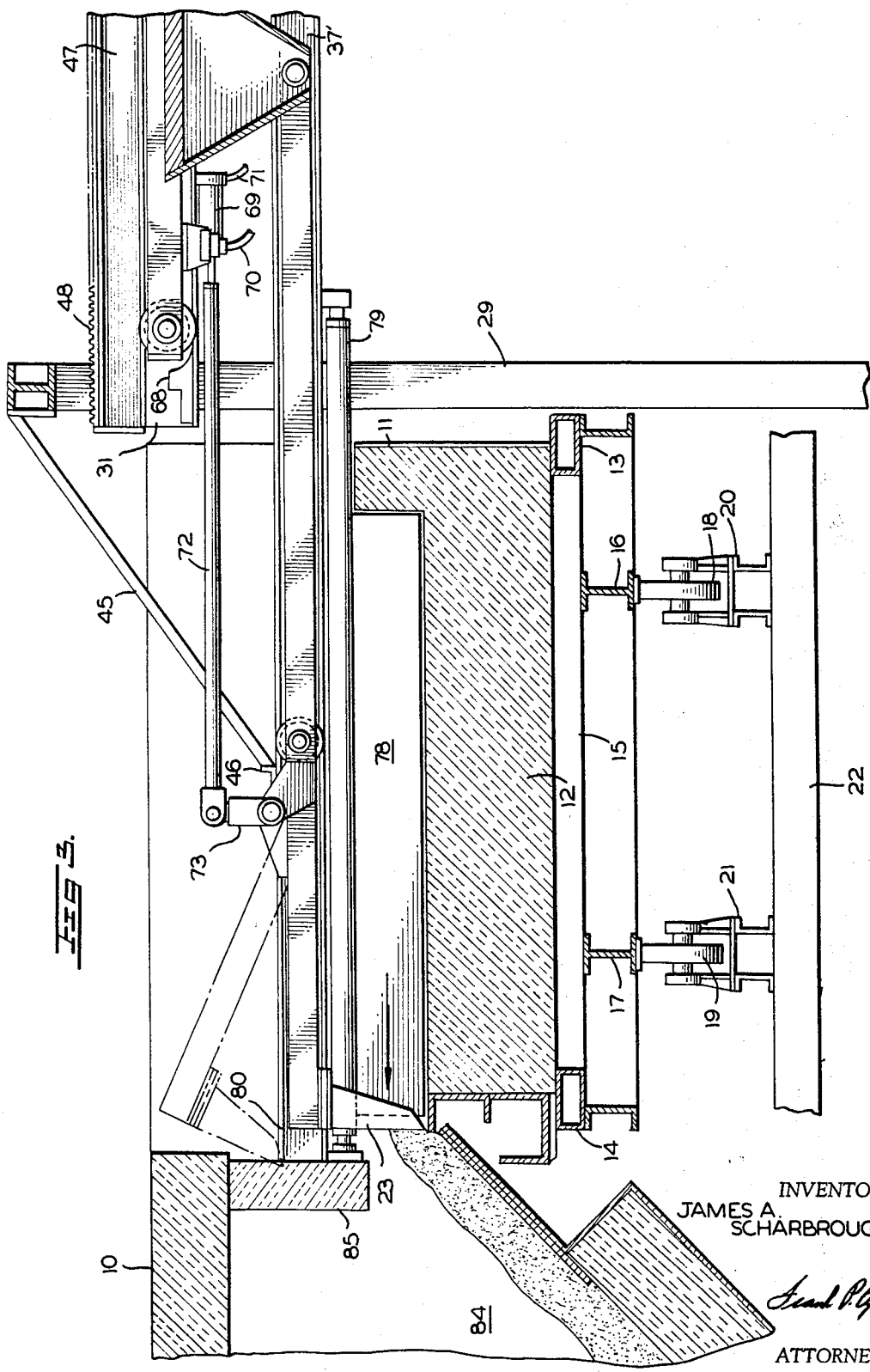

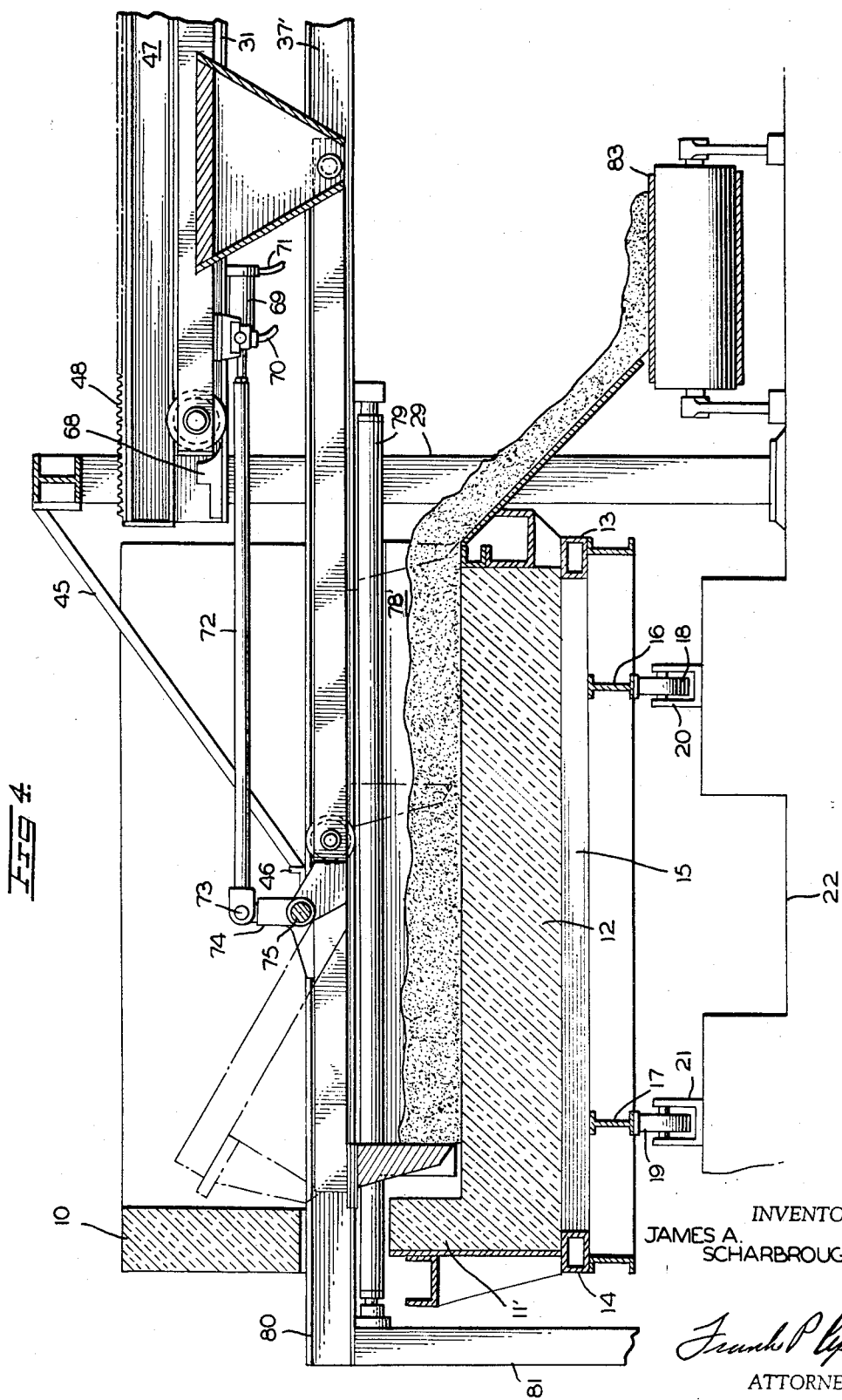

Nov. 12, 1968  J. A. SCHARBROUGH  3,410,543
MEANS FOR DISCHARGING MATERIAL FROM A ROTARY HEARTH FURNACE
Filed Nov. 22, 1965  6 Sheets-Sheet 5
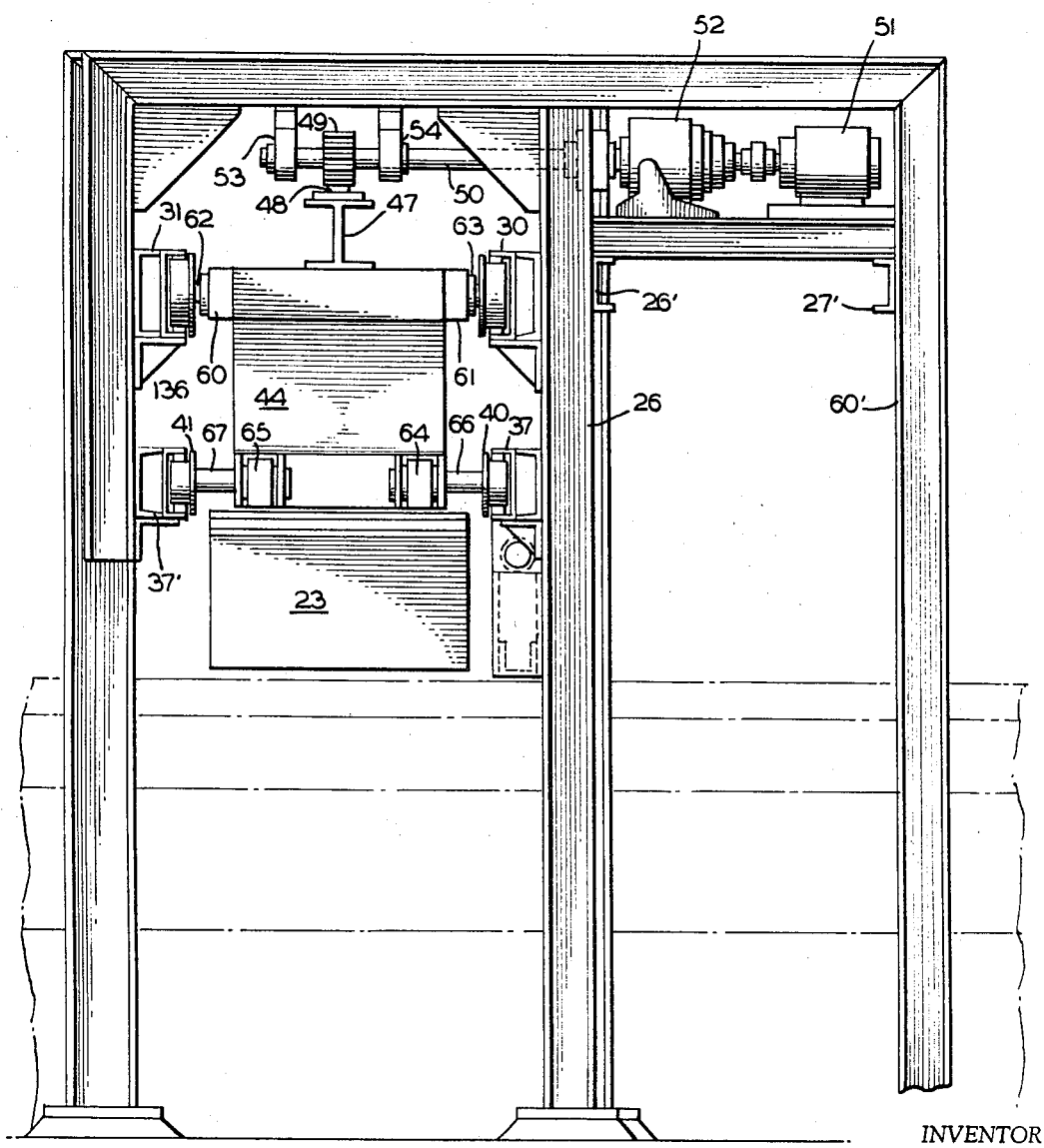
INVENTOR
JAMES A. SCHARBROUGH
BY
ATTORNEY Nov. 12, 1968     J. A. SCHARBROUGH     3,410,543
MEANS FOR DISCHARGING MATERIAL FROM A ROTARY HEARTH FURNACE
Filed Nov. 22, 1965                                     6 Sheets-Sheet 6
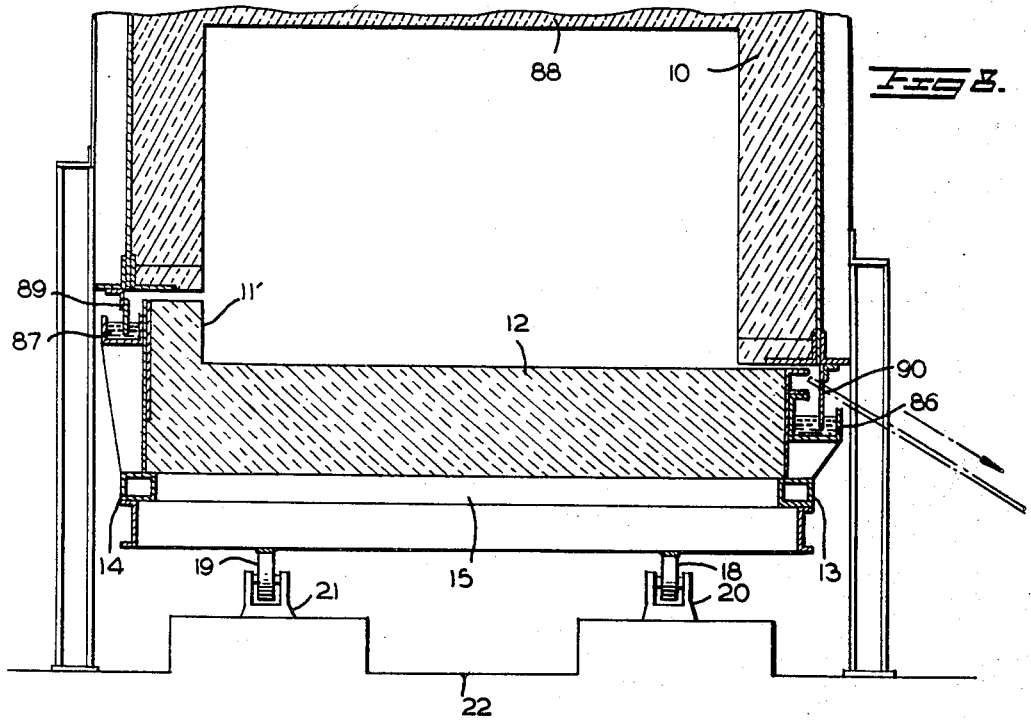
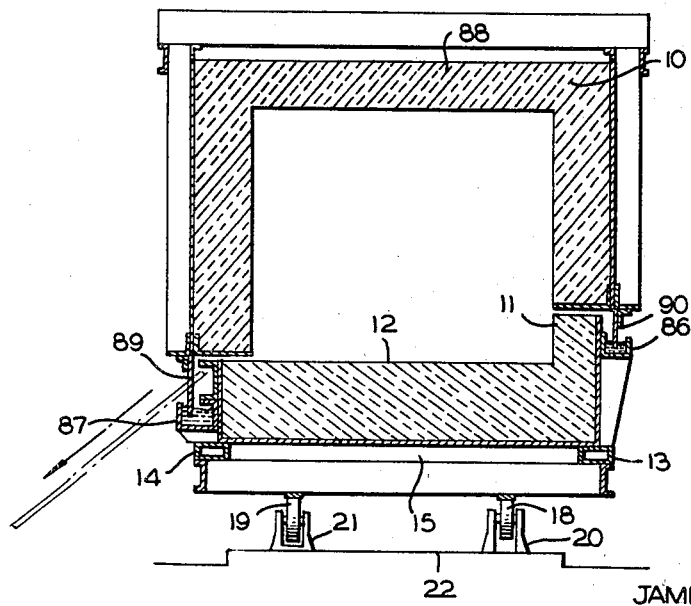
INVENTOR
JAMES A. SCHARBROUGH
BY *Frank P. Cyr*
ATTORNEY United States Patent Office 3,410,543
Patented Nov. 12, 1968

3,410,543
MEANS FOR DISCHARGING MATERIAL FROM A ROTARY HEARTH FURNACE
James A. Scharbrough, Pittsburgh, Pa., assignor to Salem Brosuis, Inc., Pittsburgh, Pa., a corporation of Pennsylvania
Filed Nov. 22, 1965, Ser. No. 509,104
2 Claims. (Cl. 263—28)

ABSTRACT OF THE DISCLOSURE

The present specification and drawings disclose a continuously rotating coking and/or calcining oven which is provided with an automatic means operating in timed sequence to effect the removal of materials from onto the moving surface of the oven and to direct such materials either outwardly of the oven and onto a suitable receiver means located outside of the oven structure or to cause such materials to be deposited into a soaking pit or area conveniently located centrally of the oven structure.

Background of the invention

The present invention relates to an improved means for automatically removed processed materials from onto a continuously moving surface which forms a part of an oven employed in the coking and/or calcining of materials.

Coking and/or calcining of coal or other carbonaceous materials has usually been accomplished by batch method whereupon such method was quite time consuming inasmuch as the materials to undergo processing had to be loaded into the processing chamber and following the processing of the materials it then became necessary to remove the entire processed materials from within the enclosure and to then re-load the same for a second batch of materials, and so on.

With the advent of coking and/or calcining ovens adapted to operate on a continuous basis as distinguished from the aforementioned batch process or method, it is desirable that some means operating in timed sequence be provided for removing the processed materials from onto the travelling surface of the continuously operating oven or furnace. Thus, the need for an automatic means for removing the processed materials from within the oven or furnace enclosure following the proper processing thereof and to effect such removal with relative ease and with a minimum number of working parts.

This invention relates to a means for automatically removing a batch of material such as coal which has been put through the necessary processing steps for coking and to deliver the processed material onto a suitable receiving means located either outwardly of a continuously operating rotary mechanism employed for coking and/or calcining said coal or to deliver said processed material into a soaking pit or the like, usually located centrally of a circular hearth employed for the treatment of such material.

In the continuous operation of a furnace or hearth employed in the coking and/or calcining of carbonaceous materials, it is most desirable that some means be employed for the removal of material treated therein so that the operations of the furnace or oven can be carried out in a most efficient manner, thereby reducing the costs in the operation of the apparatus employed in the continuous processing of materials within said furnace or hearth.

It has been found that coal or other carbonaceous materials can be successfully processed into coke and/or other calcined product by employing a continuous manner of coking and/or calcining said material undergoing treatment and that such continuous manner of carrying out the coking and/or calcining of material can probably be best carried out with a donut or pancake type apparatus. Such apparatus is shown and described in copending application of Robert J. Asquini, S.N. 230,424, now Patent No. 3,227,627, filed Nov. 15, 1962 and John L. Kemmerer, Jr. et al., S.N. 423,197, filed Jan. 4, 1965. In essence, the structure contemplated for carrying out the objects of the present invention comprises a generally circular hearth which extends for fully 360° and has a means for the admission thereinto of material to be treated therein. In the processing of coal for the production of coke, the coal is usually fed into the hearth of the oven or furnace at a designated area and is allowed to remain on the surface of the oven or furnace until such time as it has been fully processed and coke produced therefrom. Following the processing of the coal into coke it then becomes necessary that the coke, or other material derived from undergoing the treatment, aforesaid, be removed from the surface of the oven or hearth.

Prior to the advent of a continuous means for processing coal or other carbonaceous material in the formation of coke, it was generally accepted that coal or the like in the formation of coke was on a more or less batch basis, that is, coal or other carbonaceous material was loaded into a stationary furnace for instance, a beehive type furnace and therein processed and following the processing of such material, the processed material was removed therefrom and another batch of raw material to be processed was introduced into the stationary furnace. It will thus be appreciated that the batch method of coking and/or calcining of material is one which is quite time consuming by reason of having to batch load the oven or furnace and also one which usually requires the manual handling of the processed material from the bee-hive oven or furnace after the material therein has undergone the required processing.

Recent developments in the coking and/or calcining of coal or other carbonaceous materials have been directed toward the employment of an oven or furnace capable of operating on a continuous basis so as to increase the productivity of such a coking and/or calcining of carbonaceous materials and in order to increase the efficiency of such a continuously operating oven or furnace, there is provided by the disclosure of the present apparatus, a means for automatically discharging material from said oven or furnace following the processing of the material therein. The provision of automatic means for discharging processed material from the oven or furnace employed for processing said material in a continuous manner serves to improve greatly the efficiency of the oven or furnace and to provide for a greater productive capacity of the apparatus since this eliminates any manual handling of the processed material following its treatment within the oven or furnace.

The type of oven or furnace to which the present invention is directed is one which is operated on a continuous basis, preferably but not necessarily a rotary type oven or furnace and the structure of the present invention is adapted to be employed with a suitable timing mechanism which will insure that the material removing mechanism will operate in proper timed relationship with the rotary oven or hearth with which it is associated so that the material on the rotating oven or hearth will be removed therefrom at the proper time. Such an arrangement is shown broadly to be old as exemplified in Patents Nos. 1,783,155 and 1,783,156 both issued on Nov. 23, 1930.

In the continuous coking and/or calcining of material, the coal or other carbonaceous material is usually fed to a suitable inlet which deposits the material to undergo treatment onto a moving surface which usually forms the floor of the oven or furnace. The material under treatment usually goes through a plurality of zones where the material is undergoing processing and following the processing thereof so as to obtain the desired results, the material is then automatically removed from the moving surface and either deposited onto an outside receptacle or conveying surface or, in the event the oven or furnace is equipped with a soaking pit, the processed material is automatically deposited into such soaking pit. The automatic discharge means, whether it be to remove the material from the floor of the continuously operating oven or furnace to a receiver means outside of the oven or furnace or to a centrally located soaking pit is so timed in operation as to insure that the removal of the material from the floor of the oven or furnace will take place only at such time as the material undergoing treatment has been fully processed. Usually such fully processed material is attained following travel of the hearth for substantially one complete revolution of the hearth within the furnace or oven.

Summary of the invention

The structure of the present invention comprises a stationary oven structure having a continuously rotating floor or hearth area on which is loaded in any known manner coal or other carbonaceous materials to be processed during its travel through the oven area with an automatic means located outside the oven area for periodically removing the processed materials from onto the moving surface and deliver the same onto an area adjacent said rotating floor or hearth.

The main object of the present invention is to provide an automatic means for the removal of treated material from a continuously moving surface and to deposit the same outwardly of said moving surface.

Another object of the invention is to provide a reciprocating blade means operating in proper timed sequence with the rotation of a rotary hearth furnace to remove treated material from the floor of continuously moving surface and to deposit the treated material into a centrally located soaking pit.

Another object of the invention is to provide for a modified wall structure for a continuously moving surface of an oven or furnace employed in the coking and/or calcining of coal or other carbonaceous material which will permit for the removal therefrom of processed material by employing the automatic removal means of the present invention.

Another object of the invention is to provide a single means set to operate on a proper timed sequence which can be employed in one instance to push processed material from onto a continuously rotating surface into a soaking pit located centrally of a generally circular oven or furnace or to withdraw processed material from the continuously rotating surface and deliver the same to a suitable receiver means located closely adjacent to the said oven or furnace.

A still further object of the invention is to provide a means for automatically removing or unloading processed material from a continuously moving surface wherein the means for actuating said unloading mechanism is located exteriorly of the oven or furnace with which it is associated, thereby obviating deterioration of parts of the automatic mechanism due to the heat imparted by the oven or furnace.

A still further object of the invention is to provide a simplified form of drive means including a single motor for alternatively reciprocating the material removing means in proper timed relation with a continuously rotating surface to either push the processed material from onto the said rotating surface into a centrally soaking pit of an oven or furnace or to pull outwardly of said rotating surface the processed material thereon and deliver the same to a suitable receiver means located outwardly of said oven or furnace.

The foregoing and other objects, features and advantages hereof will become apparent from the following description and drawings, which are merely exemplary.

In the drawings:

FIGURE 1 is a top plan view of the batch removing apparatus of the present invention shown in association with a circular oven or furnace with parts of the oven or furnace shown in section only;

FIGURE 2 is a side elevation of the batch removing apparatus of the present invention;

FIGURE 3 is a side elevation showing the batch removing apparatus as it discharges material into a soaking pit;

FIGURE 4 is a side elevation of the batch removing apparatus, showing in full lines the removing apparatus preparatory to the removal of material and showing in dotted lines the position of the removal apparatus prior to its material engagement position and also its positions during the removal of material from a surface;

FIGURE 5 is a view taken on line 5—5 of FIGURE 1, looking in the direction of the arrows;

FIGURE 6 is a view taken on line 6—6 of FIGURE 2 of the drawings, looking in the direction of the arrows;

FIGURE 7 is a view taken on line 7—7 of FIGURE 1, looking in the direction of the arrows;

FIGURE 8 is a sectional view shown with parts broken away of the wall structure of an oven or hearth employed with the present invention wherein the material on the hearth is to be pulled outwardly of the hearth as indicated by the arrow; and FIGURE 9 is a sectional view shown with parts broken away of the wall structure of an oven or hearth employed with the present invention when the material on the oven or hearth is to be pushed into a soaking pit as indicated by the arrow.

Referring now to the drawings, there is shown at FIGURE 1 thereof a furnace 10 with which the structure of the present invention may be employed. The furnace is of the conventional rotary type furnace commonly employed in the coking and/or calcining of the materials therein. In furnaces of this general character, it is common to provide a means for continuously or otherwise feeding material thereinto for treatment such as coking and/or calcining and following the coking and/or calcining of such materials, the material from within the furnace must then be removed therefrom and to either discharge the processed material to a suitable receiver means located outwardly of the furnace or to push the processed material into a centrally located soaking pit if the furnace structure with which the present invention is associated provides for a soaking pit. It would be understood, however, the structure of the present invention can be adapted to any type furnace whether the same be provided with or without a soaking pit.

The furnace structure shown in the drawings is merely typical of the type of a furnace with which the present invention may be associated with the exception of the fact that the rotating portion of the hearth has been modified to include an upstanding wall 11 which extends completely around the outer periphery of a generally circular hearth 12 when the furnace with which the present invention is associated is provided with a centrally located soaking pit and a second upstanding wall 11' extending completely around the inner periphery of the rotary hearth 12 when the mechanism of the present invention is employed for the removal of material from upon the hearth 12 and to deliver the same to a suitable receiver means located outwardly of the furnace. In the drawings, FIGURE 3 illustrates the mechanism of the subject invention when it is employed for pushing processed material from upon the rotary hearth 12 into a centrally located soaking pit, whereas FIGURE 4 discloses the mechanism of the present invention when it is associated with a rotary furnace and the material on the rotating hearth, after it has been duly processed in the furnace, is pulled outwardly of the rotating hearth and onto a suitable receiver means located outwardly of the furnace structure.

The hearth 12 and upstanding wall portions 11 and 11' are constructed of a suitable refractory material and are suitably supported upon a pair of generally rectangularly formed beams 13 and 14 which extend under and completely around the inner and outer peripheries of the rotating hearth 12. Suitably spaced along the undersurface of the hearth 12 are transverse supports 15 which have mounted on the undersurface thereof a pair of I-beams 16 and 17. The beams extend completely around the undersurface of the hearth 12 and are adapted to engage or contact roller structures 18 and 19 which are suitably mounted for rotation on stationary brackets 20 and 21 which are fixed to a stationary support 22. As many brackets and roller mounts thereon can be employed along the undersurface of the supports for the rotating hearth as are deemed feasible to insure a proper rolling support for the rotating hearth.

The manner of mounting a rotary hearth such as described above is more or less conventional and forms no part of the present invention and the disclosure of such a manner of mounting a rotary hearth such as depicted in the accompanying drawings should not be construed as limiting the present invention in any manner. The rotary hearth of the present invention will be driven for rotation through a suitable source of power, not shown. The source of power can comprise an electric motor and suitable gearing mechanism associated therewith for rotating the hearth at selected speeds, the speed of rotation of the hearth being dependent upon the nature of the material being treated within the furnace.

The subject of the present invention is particularly suitable for use with a rotary hearth furnace employed in the coking and/or calcining of coal or like carbonaceous materials. In such furnaces, coal or other carbonaceous material is fed onto the rotating hearth and the material is treated within the furnace for substantially its entire travel through the furnace and upon completion of a substantially 360° travel of the hearth, the material thereon has been completely processed and is then ready to be removed from upon the surface of the hearth and either deposited on a suitable receiver means located outwardly and adjacent the furnace or if the furnace is provided with a centrally located soaking pit, then the mechanism of the present invention can be employed for performing either of the aforementioned operations.

Referring particularly to FIGURES 3 and 4 of the drawings, the pusher and/or puller mechanism of the instant invention includes a blade-like member 23 which is caused to extend over the rotating hearth 12 to perform its intended function in a manner to be more fully described hereinafter.

A plurality of vertical supports 24, 25, 26 and 27 are disposed at preselected positions on a stationary surface 28. Like pairs of vertical supports, only one of them shown at 29 in FIGURES 3 and 4 serve as a means for supporting a pair of horizontally disposed beams 30 and 31 which when assembled with the aforementioned vertical supports 24, 25, 26 and 27 defines a generally rectangular frame formation indicated by reference character 32 of FIGURE 1 of the drawings. The rectangular frame formation is employed for supporting the working mechanism of the present invention.

Horizontal beams 30 and 31 are of a generally rectangular formation and are secured to upright members 24, 25, 26, 27 in any suitable manner with one side of the beams open as seen at 33 and 34 of FIGURE 6 of the drawings so as to provide a track or raceway for the rollers 35 and 36. A pair of stationary beams 37 and 37' are mounted in any suitable manner on vertical supports 24 and 25. The beams 37 and 37' define raceways 38 and 39 for rollers 40 and 41 which are supported by suitable brackets 42 and 43 secured to the lower end of a generally triangularly shaped support 44. A brace bar 45 extends from vertical support 24 and is secured to an L-shaped cross member 46 which extends between and is secured to beams 37 and 37' as clearly illustrated in FIGURES 2, 3 and 4 of the drawings.

Mounted on the upper surface of the triangular shaped support 44 is an I-beam 47 with a rack 48 formed thereon which is adapted to mesh with a gear 49 which is suitably splined to a rotating shaft 50 which leads and is secured to an electric motor or the like 51. A suitable gear reduction unit 52 of conventional construction can be interposed between the motor 51 and gear 49. The gear 49 is suitably journaled for rotation in mountings 53 and 54 suitably mounted on a pair of cross plates 55 and 56 which extend between frame members 57 and 58 as shown in FIGURE 1 of the drawings. The drive means 51 and gear reduction unit are suitably supported on a plate like member 59 which is secured in any manner to a pair of angle irons 60 and 61 which are secured, as by welding, to a pair of vertical supports 26 and 60 as clearly shown in FIGURE 5 of the drawings.

It will be understood that all of the frame work employed for supporting the working mechanism of the present invention will be properly secured to one another as by welding or other type securing means and suitable cross bracing will be employed wherever it is found necessary to provide for a sturdy frame work and one which will adequate support the equipment employed for unloading material from a moving hearth.

As will be seen from FIGURE 6 of the drawings, support 44 is provided at the upper end thereof with a pair of rectangularly shaped support channels 60 and 61. The channels are fixed to the support 44 and rotatably receive shafts 62 and 63 extending from rollers 35 and 36. A like pair of support channels 64 and 65 are likewise secured to the lower end of the support 44 between brackets 42 and 43 and they also rotatably receive shafts 66 and 67 which extend from rollers 40 and 41. Thus with the arrangement of parts, as aforesaid, any movement imparted to the support 44 will cause said support and its associated parts to likewise move along with the same on the roller and raceways provided. While FIGURE 6 of the drawings shows but one set of rollers 35 and 36 operating in tracks or raceways 32 and 33, it will be obvious as shown in FIGURE 2 of the drawings that the support channels 60 and 61 will each be provided with two sets of such rollers. Likewise, the channels 64 and 65 mounted at the lower end of the support will also each be provided with two sets of such rollers operating in tracks or runways 38 and 39 as shown in dotted lines in FIGURE 2. A suitable stop means indicated by reference numeral 68 is provided at one end of the raceway defined by beams 30 and 31 so as to limit the inward movement of the blade 23 within the furnace.

Mounted in any suitable manner to the support channels 60 and 61 and adapted to travel along with the same is a power means, in this instance shown as a hydraulic or pneumatic cylinder 69 which is provided with the customary flow lines 70 and 71 leading to a suitable source of fluid under pressure. An operating arm 72 connects at one end to the cylinder 69 and at the other end thereof, the arm is pivotally secured as at 73 to one arm 74 of a crank mechanism which pivotally supports the blade 23. As will be obvious, when pressure is applied in line 70 of the cylinder 69, the operating arm 72 will be drawn inwardly of the cylinder and during such inward movement, the blade 23 will be rocked on a support bearing 75 and assume the position shown in dotted lines in FIGURES 3 and 4 of the drawings. Thus, it will be seen that the blade 23 can be elevated to a position shown in dotted lines in FIGURES 3 and 4 so as to enable the blade to clear the material undergoing treatment on the hearth in its inward movement within the furnace. After the blade has reached its innermost position within the furnace, pressure is applied through flow line 71 so as to cause the blade to again pivot on the support bearing 75 and to be lowered to a position shown in full lines in FIGURE 4 of the drawings. While the cylinder 69 and its associated parts are employed only for raising or lowering the blade in the manner aforesaid, the power for advancing or retracting the blade from within the furnace is derived from the motor means generally indicated by reference character 51 which drives the gear 49 which meshes with the rack 48 which in turn causes the support 44 and its associated parts to travel either inward or outward of the furnace for unloading material from therewithin.

The furnace 10 depicted in the appended drawings is usually in the nature of a rotary type furnace having a roof thereon for completely enclosing the rotating hearth mounted therein. In the instant invention, the roof of the furnace is cut away as indicated by reference character 76 so as to permit the movement of the blade 23 across the hearth 12 for the removal of materials thereon. The cut away portion 76 of the furnace is provided with a conventional feeding device 77 which can be in the nature of a hopper or like structure. Placed in advance of the hopper 77 is a stationary back plate member 78 for a purpose to be more fully described hereinafter.

The back plate 78 is supported within the furnace and extends in close proximity to the surface of the hearth 12 by means of a support bar 79 suitably secured to the frame work of the furnace.

As stated previously, the blade 23 of the present invention is capable of removing material from a hearth and to either deposit the material to a suitable receiver means located outwardly of the furnace or in instances where the furnace is provided with a centrally located soaking pit, the blade of the subject invention can be utilized for pushing the material from the hearth into the soaking pit. However, the manner of operation of the blade 23 and its associated parts is the same whether it be for pulling material off the hearth or for pushing the same inwardly of the furnace into a soaking pit. Therefore, it will be seen that some minor structural installations will be required where the blade of the instant invention is utilized for pulling material outwardly of the hearth. For instance, referring to FIGURE 2, the intermediate beam 80 to which is secured the stationary beams 37 and 37' extend throughout the width of the hearth of the furnace and is suitably supported at the end thereof by a vertical support 81 which is placed outwardly of the furnace and is properly anchored to a suitable stationary support 82. This structure will permit for the removal of material from the hearth outwardly therefrom and onto a suitable receiver means, in this case illustrtaed as an endless type conveyor 83. Obviously, any type of a conveyor means can be employed or, for that matter, any receiver means can be substituted for the conveyor shown.

Where the furnace is provided with a centrally located soaking pit such as shown by reference numeral 84 of FIGURE 3, the intermediate beam 80 which supports the stationary beams 37 and 37' are anchored at their inner ends to a depending beam structure 85 shown in FIGURE 3 of the drawings. The intermediate beam can be secured to the depending beam in any manner such as welding and the like. As will be observed from FIGURE 3 of the drawings when it is desired to remove material from upon the hearth and to deliver the same into a soaking pit, the blade is elevated to the position in dotted lines of FIGURE 3 and is pulled rearwardly by the gear and rack arrangement, aforesaid, until such time as the blade has cleared the material which is on the hearth and then it is lowered to the position shown in full lines in FIGURE 3 and caused to travel inwardly thereby scraping off the material from the hearth and delivering the same to the soaking pit.

As stated previously, upstanding walls 11 and 11' are provided for a definite purpose. In the case of a furnace which is provided with a centrally located soaking pit, the upstanding wall 11 is formed along the outer periphery of the hearth such as clearly shown in FIGURES 3 and 9 of the drawings whereas, when the furnace is not provided with a soaking pit and the material on the hearth is to be removed therefrom and deposited onto a suitable outside receiver means then the upstanding wall 11' extends along the inner periphery of the rotating hearth as shown in FIGURES 4 and 8 of the drawings. As is conventional, a sealing is effected between the rotary portion of the furnace and the stationary portion thereof. Referring now to FIGURES 8 and 9 of the drawings, the rotating hearth 12 has mounted along the outer edges thereof channel irons 86 and 87 which are adapted to contain either a liquid or sand or the like and the stationary portion of the furnace generally indicated by reference character 88 is provided with flanges 89 and 90 which are adapted to ride in said channels and by virtue of the material within the channels a seal is effected between the stationary and rotating portions of the furnace. By providing upstanding wall portions 11 and 11', aforesaid, it will be appreciated that at least one of the seals will be protected from having introduced therein any of the material undergoing treatment. This can be readily understood by reference to FIGURES 8 and 9 of the drawings wherein the upstanding wall portions are of such height as to prevent material undergoing treatment on the hearth 12 from coming in contact with the seal adjacent the upstanding portions.

In operation, material to undergo treatment in the furnace depicted herein is introduced onto the rotating hearth through the hopper means 77 and deposited onto the hearth 12. The hearth rotates in the direction of the arrow shown in FIGURE 1 of the drawings and heat is provided within the furnace either from external sources so as to process the material undergoing treatment or if the volatiles which are derived from the coal or other carbonaceous material undergoing treatment in the furnace are sufficient to permit operation of the furnace on an autogenetic basis then there is no need for outside burners to furnish the heat for the processing of materials undergoing treatment. The material under treatment on the hearth 12 travels along substantially 360° and when the hearth and material thereon has traveled this distance, the material is then ready for removal from the hearth. The removal of the material takes place at the cutaway portion of the furnace designated by reference character 76. When the material is to be removed from the hearth the blade and its associated parts are caused to operate in the manner aforesaid, either for pushing the material into a centrally located soaking pit or to pull the material off the hearth and to deliver the same to an outside receiver source. The movement of the blade 23 for the removal of material from the hearth 12 is set in timed relationship with the rate of rotation of the hearth. Therefore, if a relatively deep bed of material is undergoing process on the rotating hearth then the time for processing such depth of material will be considerably more than if a thin layer of material is to be processed. Therefore, it is essential that the movement of the blade 23 be set in timed relation with the rate of rotation of the hearth as otherwise the blade would be moved back and forth unnecessarily and without accomplishing any definite results. With the timing of the parts, as aforesaid, when material to be removed from the hearth has reached the cutaway portion of the furnace, then the blade is caused to travel either forwardly or rearwardly depending upon the type of furnace with which it is employed and to thereby remove the fully processed material from thereon. The back plate member acts in the manner of a scraper and thus prevents any already processed material from reentering the furnace.

It is to be understood that the described exemplary embodiment is merely intended for the purpose of illustration, and that the principles of the invention are not intended to be limited thereto, except as defined in the appended claims.

What is claimed is:

1. In an apparatus for automatically removing processed material from the surface of a continuously rotating circular hearth mounted within a furnace and directing the same to a receiving area centrally located within said hearth comprising, a plurality of vertical supports, horizontally disposed raceways mounted on said supports, a travelling support, support channels secured to said travelling support, said channels and travelling support mounted for linear movement within said raceways, a reciprocating material removing blade secured to said travelling support, a first power means mounted on said vertical supports for effecting linear movement of said travelling support and blade secured thereto, a second power means secured to said support channels, said second power means effecting a pivotal movement of said blade for elevating the same to a position above the level of the materials on said rotating hearth and to retain the same in said elevated position while said first power means effects rearward travel of said blade means to a predetermined position within the furnace, said second power means thereupon pivotally lowering said elevated blade to a position closely adjacent the surface of said rotating hearth and thence, said first power means effects a forward linear movement of said blade to scrape off materials from onto the surface of said rotating hearth and to direct the same interiorly to a receiving area centrally located within said rotating hearth.

2. In an apparatus for automatically removing processed material from the surface of a continuously rotating circular hearth mounted within a furnace and directing the same to a receiving area located exteriorly of said furnace comprising, a plurality of vertical supports, horizontally disposed raceways mounted on said supports, a travelling support mounted for linear movement within said raceways, a reciprocating material removing blade secured to said travelling support, a first power means mounted on said vertical supports for effecting linear movement of said travelling support and blade secured thereto, a second power means secured to said support channels, said second power means effecting a pivotal movement of said blade for elevating the same to a position above the level of the materials on said rotating hearth and to retain the same in said elevated position while said first power means effects forward travel of said blade means to a predetermined position within the furnace, said second power means thereupon pivotally lowering said elevated blade to a position closely adjacent the surface of said rotating hearth and thence, said first power means effects a rearward linear movement of said blade to scrape off materials from onto the surface of said rotating hearth and to direct the same to a receiving area located exteriorly of said furnace.

References Cited

UNITED STATES PATENTS

| | | | |
|---|---|---|---|
| 923,140 | 6/1909 | Clarke | 214—25 |
| 3,179,264 | 4/1965 | Tallquist | 198—222 X |
| 2,622,861 | 12/1952 | Talley | 214—21 XR |

ROBERT G. SHERIDAN, *Primary Examiner.*